United States Patent [19]
> Mitsuhashi

[11] Patent Number: 5,060,078
[45] Date of Patent: Oct. 22, 1991

[54] VIDEO SIGNAL PROCESSING APPARATUS HAVING A NOISE REDUCTION CIRCUIT

[75] Inventor: Yasuo Mitsuhashi, Nagaokakyo, Japan

[73] Assignee: Mitsubishi Denki Kabushiki Kaisha, Tokyo, Japan

[21] Appl. No.: 379,969

[22] Filed: Jul. 14, 1989

[51] Int. Cl.$^5$ .............................................. H04N 5/76
[52] U.S. Cl. .................................................. 358/340
[58] Field of Search ................... 358/36, 37, 166, 167, 358/335, 336, 340, 327, 330

[56] References Cited

U.S. PATENT DOCUMENTS

| | | |
|---|---|---|
| 3,424,861 | 1/1969 | Delvaux . |
| 3,723,638 | 3/1973 | Fujita . |
| 4,384,306 | 5/1983 | Liu ...................................... 358/166 |
| 4,402,006 | 8/1983 | Karlock ................................ 358/31 |
| 4,520,396 | 5/1985 | Dischert et al. . |

FOREIGN PATENT DOCUMENTS 1-15228  3/1989  Japan .
1-15229  3/1989  Japan .

OTHER PUBLICATIONS

Great Britain Patent Application GB-A-2206012 to Nakata et al., dated Jun. 8, 1988.
Great Britain Patent Application GB 2 200 508 A to Waldron et al., dated Nov. 2, 1987.
Great Britain Patent Application 2 157 528 A to Hirota et al., dated Mar. 21, 1985.
Great Britain Patent Application GB-A-2122547 to Tsunoda et al.
Great Britain Patent Application GB 2104 338 A to Hirota, dated Jun. 21, 1982.
Great Britain Patent Application GB 2 098 825 A to Esser et al., dated Apr. 8, 1982.
European Patent Application 260 913 to Hidetoshi.
European Patent Application 167 387 to Haruo.

*Primary Examiner*—Robert L. Richardson

[57] ABSTRACT

A video signal processing apparatus which is adapted to a VTR (video tape recorder) and various other video players for processing a video signal so as to reduce noise. A video signal passed through a demodulator and a deemphasis circuit is input to a noise canceller circuit so as to remove most of the noise component thereof. The video signal is then provided with narrow and deep peaks at the respective rising transient portion and the breaking transient portion with bipolarity by an outline emphasizing circuit. Thus, smooth signal processing of the group delay characteristic is enabled in a wide frequency band, thereby producing a video signal having excellent sharpness and not including a strain such as overshoot or ringing.

7 Claims, 9 Drawing Sheets

VIDEO SIGNAL PROCESSING APPARATUS HAVING A NOISE REDUCTION CIRCUIT

BACKGROUND OF THE INVENTION

1. Field of the Invention

The present invention relates to a video signal processing apparatus which is adapted to a television receiving set or a video reproducer such as a video tape recorder (hereinunder referred to as "VTR") and a disk player so as to improve the signal-to-noise ratio of a video signal and the sharpness of a picture through noise reduction processing of the video signal.

2. Description of the Prior Art

The picture quality of a television receiving set or a video reproducer such as a VTR and a disk player is influenced by the balance among three factors, namely, the signal-to-noise-ratio of a video signal, the resolution and the sharpness.

Figure 7:
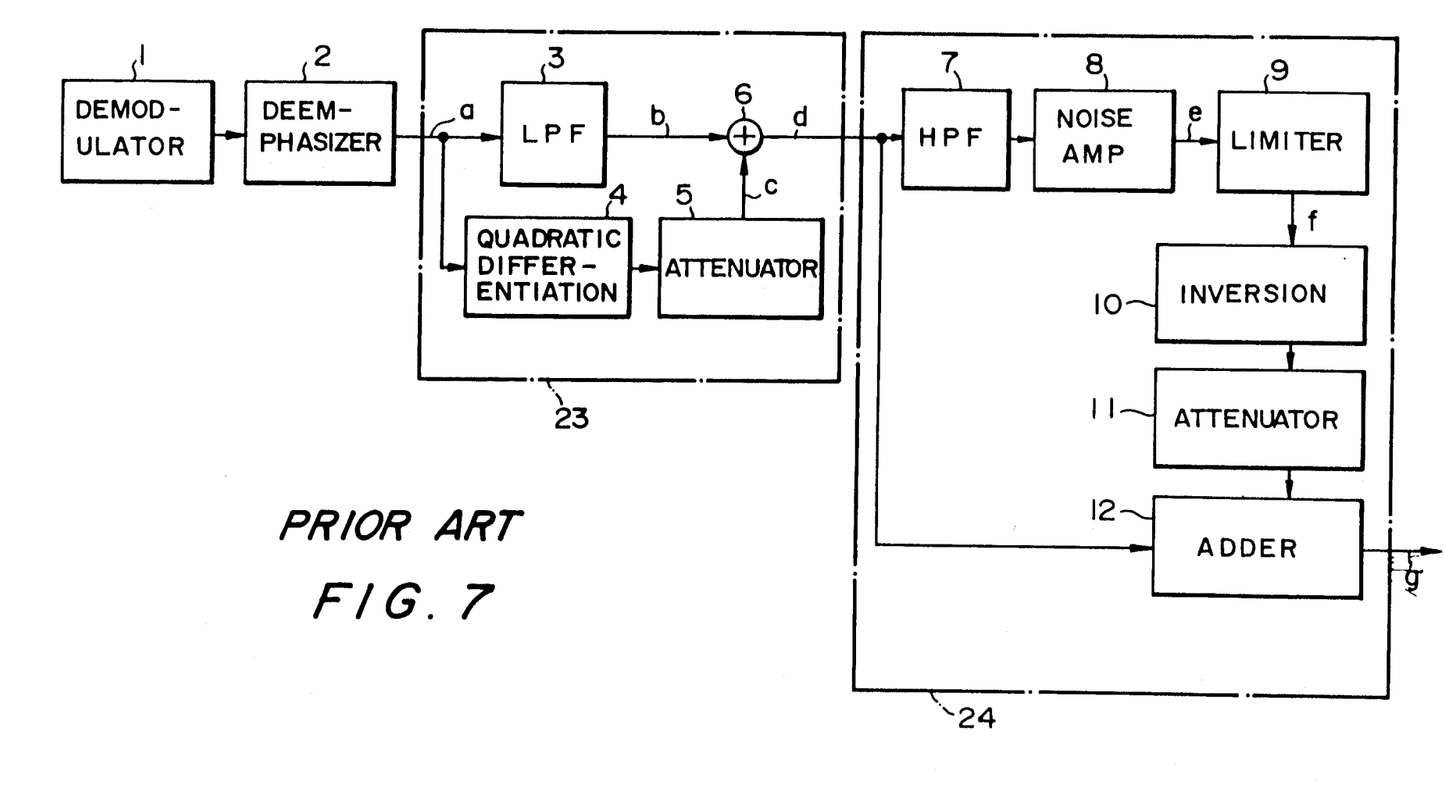
FIG. 7 is a block diagram of the structure of a conventional video signal processing apparatus.

FIG. 7 is a block diagram of the structure of a video signal processing apparatus in a conventional VTR which has been developed with a view to improving the signal-to-noise-ratio of a video signal and the sharpness. In FIG. 7, an FM video signal of 3.4 to 4.4 MHz picked up by a playback head enters a demodulator 1 to be demodulated to a video signal of the baseband. This video signal is supplied to a deemphasis circuit 2 which suppresses the high-frequency component of a video signal recorded while emphasizing the high-frequency component by a preemphasis circuit so as to reduce the high-frequency noise component penetrated on a recording and reproducing system of the video signal. That is, the deemphasis circuit 2 has the reverse characteristics of the preemphasis circuit.

The thus-deemphasized video signal is then supplied to a low pass filter (hereinunder referred to as "LPF") 3, which cuts off the high-frequency band of the video signal. Simultaneously with this, the deemphasized video signal is supplied to a quadratic differentiation circuit 4, wherein the transient portion and the noise component of the video signal are differentiated, and the level of the differentiated signal is attenuated to an appropriate level by an attenuator 5. The output signal of the LPF 3 and the output signal of the attenuator 5 are added by an adder 6. These LPF 3, quadratic differentiation circuit 4, attenuator 5 and adder 6 constitute a quadratic differentiation type picture quality improving circuit 23.

A high pass filter (hereinunder referred to as "HPF") 7 picks up the noise component included in the video signal from the output of the circuit 23. The picked up signal is then passed through a noise amplifier 8 for amplifying the noise component, a limiter 9 for limiting the amplitude of the noise component, a polarity inverter 10 and an attenuator 11, wherein the amplitude of the noise component limited by the limiter 9 is set at the optimum value.

The output signal of the quadratic differentiation type picture quality improving circuit 23 and the noise component signal with the polarity inverted are added by an adder 12. These HPF 7, noise amplifier 8, limiter 9, polarity inverter 10, attenuator 11 and adder 12 constitute a noise canceller circuit 24.

The operation of the prior art apparatus having the above-described structure will now be explained.

An FM video signal of 3.4 to 4.4 MHz, which has passed through the preemphasis circuit so as to be recorded while emphasizing the high-frequency component, is picked up by the playback head and input to the demodulator 1, thereby being demodulated to a video signal of the baseband. The demodulated video signal is then input to the deemphasis circuit 2 having the reverse characteristic of the preemphasis circuit so that the high-frequency component is suppressed so as to reduce the high-frequency noise component. Sufficient reduction of the high-frequency component, however, is not brought about solely by such a treatment of the emphasized high-frequency component, and a large noise component n remains, as indicated by (a) in FIG. 8. Especially, when the quality of a magnetic tape loaded on the VTR is poor, a considerable amount of noise n remains.

Figure 8:
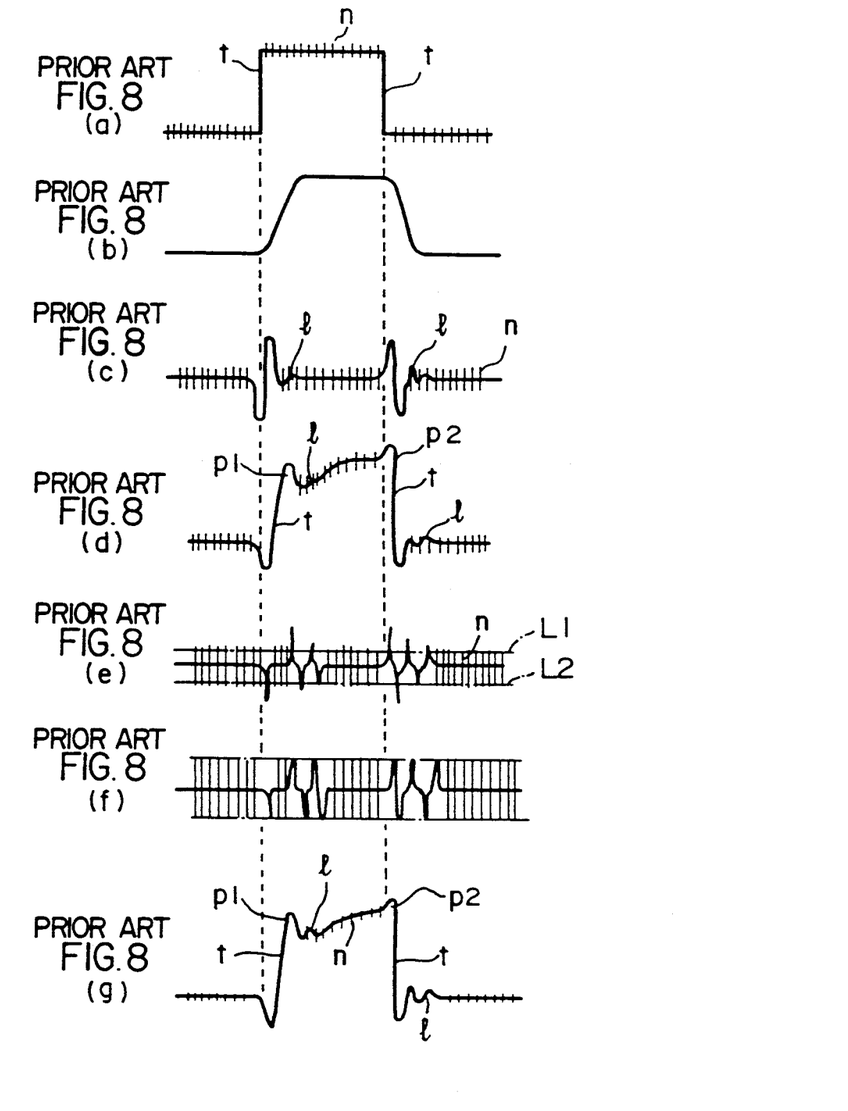
FIG. 8 is the actuating signal waveform diagram of the apparatus shown in FIG. 7.

When the video signal, including a large noise component n as the signal (a) in FIG. 8, is supplied to the quadratic differentiation type picture quality processing circuit 23, the video signal first passes through the LPF 3 and the high-frequency component and the noise component are removed, thereby producing a signal indicated by (b) in FIG. 8.

On the other hand, the video signal also passes the quadratic differentiation circuit 4, wherein the transient portion t at which the level of the video signal is rapidly changed is differentiated two times and the noise component of the video signal is also differentiated. The level of the differentiated signal is attenuated to an appropriate level by the attenuator 5, thereby generating a waveform signal indicated by (c) in FIG. 8.

The signal output from the LPF 3 and indicated by (b) in FIG. 8 and the signal output from the attenuator 5 and indicated by (c) in FIG. 8 are added by the adder 6, thereby generating a signal indicated by (d) in FIG. 8. The signal (d) includes the noise component n but since appropriate peaks p1 and p2 are added to the rising transient portion of the original video signal (a) at which the video signal rapidly changes from the white level to the black level and the breaking transient portion at which the video signal rapidly changes from the black level to the white level, respectively, this video signal has increased sharpness in the picture quality.

The video signal (d), with the sharpness in the picture quality increased, is then input to the noise canceller circuit 24. The video signal input to the noise canceller circuit 24 passes through the HPF 7 and the noise amplifier 8, whereby the noise component n and the high-frequency component of the video signal are amplified, thereby producing a signal indicated by (e) in FIG. 8.

The amplitude of the noise component n is limited to L1 and L2 set by the limiter 9, thereby generating a signal indicated by (f) in FIG. 8. The polarity of the signal shown (f) is inverted by the polarity inverter 10. After the signal is attenuated by the attenuator 11 to an appropriate level, it is input to the adder 12 to be added to the signal (d), thereby generating a signal indicated by (g) in FIG. 8. The signal (g) is a processed video signal having a sharpness with the noise component n removed from the original video signal and provided with the peaks p1 and p2 at the rising transient portion and the breaking transient portion, respectively, by quadratic differentiation.

This prior video signal processing apparatus may be adapted as a video signal outline correcting means for emphasizing especially the outline portion of a video signal. The operation in this case will be explained as follows.

Figure 9:
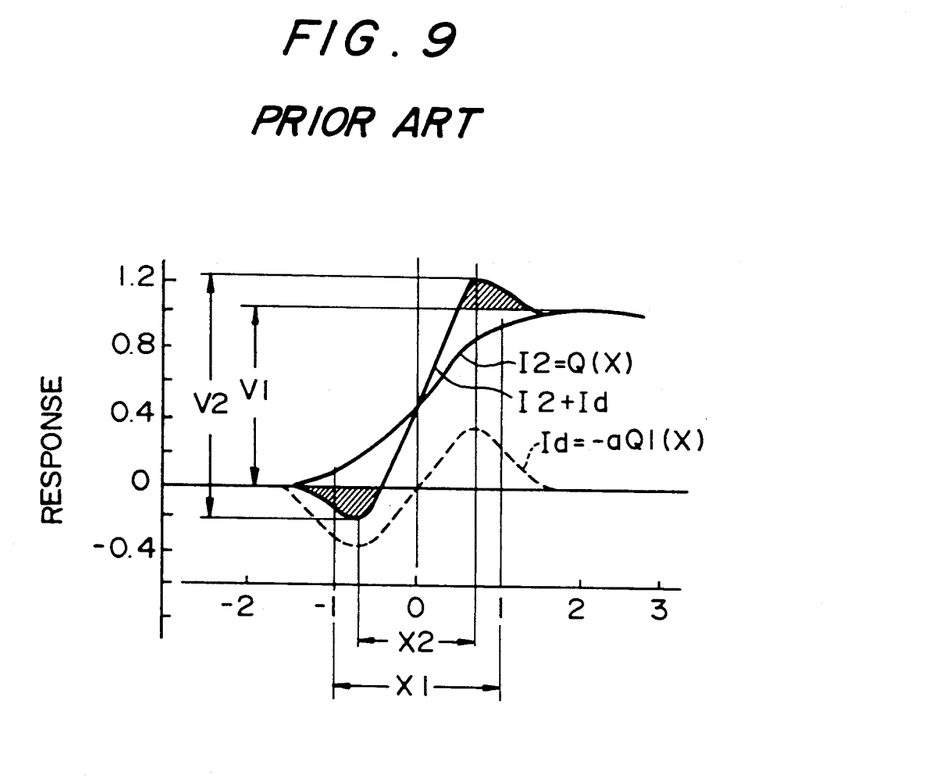
FIG. 9 is a detailed view of a waveform obtained by a conventional quadratic differentiation type outline correcting means.

FIG. 9 shows the rising variation of a step waveform with the emphasized edge in the prior art which is described in "A Calculation Method of the Sharpness in a Television Picture" in THE TRANSACTIONS OF THE INSTITUTE OF ELECTRON-ICS, INFORMATION AND COMMUNICATION ENGINEERINGS JAPAN, Vol. J66-B No. 7 (1983, Jul.). As is clear from FIG. 9, the conventional correcting means for emphasizing the outline portion of a video signal obtains the quadratically differentiated signal of the waveform of the original signal, multiplies the signal by a certain coefficient, and adds the waveform of the original signal to the product.

With reference to FIG. 9, a waveform Q1 (X) is obtained by the quadratic differentiation of a step waveform I2 (=Q(X)), which is the original signal with the frequency band limited by a transmission pass, and the waveform Q1 is multiplied by a certain coefficient "-a" to obtain a waveform Id. The thus-obtained waveform Id is added to the original signal waveform I2 to obtain an outline correction signal waveform I2+Id.

If the rise time improvement with the outline correction means is represented by the time relative to the change in amplitude (response), it is V2/X2 for the outline corrected signal waveform I2+Id, while it is V1/X1 for the original signal waveform I2. It is thus clear that the rise time is considerably improved The improvement of the outline portion of the video signal including an emphasis of the outline portion leads an improvement in the sharpness of the picture.

The above-described conventional method, however, is disadvantageous in that the noise in a video signal cannot be completely eliminated and the existence of the peaks p1, p2 for enhancing the sharpness of a picture cause new deterioration of the picture and emphasize the noise component.

More specifically, the peaks p1, p2 are formed fundamentally by quadratic differentiation in the prior art, as described above, and in order to provide the peaks p1, p2 with a certain degree of height by quadratic differentiation, the peak pulse width is also required to be enlarged considerably, as shown in FIG. 8, thereby producing the peaks p1, p2 with irregular shapes. These irregularly-shaped peaks exert deleterious influence on the subsequent noise reduction processing. Thus, the sharpness is greatly deteriorated by the formation of irregularly-shaped peaks.

In addition, when the peaks p1, p2 are produced in this way, ringing l is inevitably produced behind the peaks as in the signals (c), (d) and (g) in FIG. 8, thereby repeating periodic damping, which disadvantageously accelerates the deterioration of the picture quality.

Furthermore, since the output signal of the deemphasis circuit 2 is directly subjected to quadratic differentiation in the state in which the noise component of the video signal itself remains as it is, the noise component is enlarged in proportion to the peaks pl, p2 at the instant of the formation thereof, so that the improvement of the picture quality as a whole is not achieved.

When the conventional video signal processing apparatus is used for correcting video signal outline, the process consists of the steps of obtaining the quadratically differentiated signal of the waveform of the original signal, multiplying the signal by a certain coefficient, and adding the waveform of the original signal to the product. By this process, however, the outline correction signal obtained sometimes exceeds the level of the original waveform, as indicated by the hatched portion in FIG. 9, and when the original signal waveform has the maximum amplitude in the, dynamic range of the transmission system, the waveform is saturated.

If the quadratic differentiation is carried out so as to provide the peak values with a large amplitude, the pulse width of the peak is disadvantageously enlarged and the ringing l is generated, as in the signals (c),(d) and (g) shown in FIG. 8. Therefore, not only is the signal-to-noise ratio not improved as much as possible, but also the overshoot or preshoot is so strong as to display an unnatural picture or the ringing phenomenon causes an indistinct picture.

SUMMARY OF THE INVENTION

Accordingly, it is an object of the present invention to eliminate the above-described problems in the prior art and to provide a video signal processing apparatus which is capable of greatly improving the signal-to-noise ratio and the sharpness of a picture by making large and narrow peaks at transient portions.

It is another object of the present invention to provide a video signal processing apparatus which is capable of improving the sharpness of a picture by emphasizing the outline and producing a picture with high distinction free from a ringing phenomenon.

To achieve this aim, a video signal processing apparatus according to the present invention is characterized by a noise canceller circuit provided after to a demodulator and a deemphasis circuit. The noise canceller circuit comprising an LPF and a first subtracter, a limiter and a second subtracter, and a first adder for adding the output signal of the second subtracter on the side of the limiter and the output signal of the LPF. At the next stage to the noise canceller circuit, an outline emphasizing circuit composed of two delay circuits connected in series, two adders and a subtracter so as to form peaks at transient portions of a video signal is provided.

A video signal processing apparatus according to the present invention is also characterized in that it includes a first delay circuit for delaying an input video signal by a predetermined time and a second delay circuit for delaying the video signal by a longer time than the first delay circuit, and in that the outline emphasis is carried out by adding the output signal of the second delay signal and the input video signal, subtracting the signal obtained by the addition from the output signal of the first delay circuit and slicing the signal obtained by the subtraction at a predetermined level and adding the sliced signal to the output signal of the first delay circuit, thereby adding peak signals at transient portions of the video signal to the input video signal.

A video signal processing apparatus according to the present invention is further characterized in that the ratio of the outline correction signal added to the input video signal is automatically varied in accordance with the output signal of a noise sensor for detecting the noise component of the input video signal.

According to the present invention, in order to eliminate most of the noise component from the video signal, the signal, which has been demodulated to the baseband by the demodulator and the high-frequency noise component of which has been reduced by the deemphasis circuit, is input into the noise canceller circuit. The video signal with most of the noise component eliminated is thereafter input into the outline emphasizing circuit, wherein narrow and deep peaks are added to the respective rising transient portion and breaking transient portion of the video signal with bipolarity. Thus, a video signal with excellent sharpness is obtained.

In addition, according to the present invention, it is preferable to supply a video signal to the two delay circuits and the adder and the subtracter, wherein narrow and deep peaks for emphasizing the outline are added to the respective rising transient portion and breaking transient portion of the video signal, thereby generating an outline correction signal, and by slicing the tip portions of the outline correction signal, the outline correction signal including no noise component is obtained. Thus, a picture having high sharpness and distinction is obtained.

If the amount of emphasis of the rising transient portion and the breaking transient portion is controlled in accordance with the noise component of the input video signal, in place of slicing the tip portions of the outline correction signal, an outline correction signal, with little noise component is obtained without producing saturation even if the input signal has a large amplitude, whereby the sharpness of the picture is greatly improved.

The above and other objects, features and advantages of the present invention will become clear from the following description of the preferred embodiments thereof, taken in conjunction with the accompanying drawings.

DESCRIPTION OF THE PREFERRED EMBODIMENTS

An embodiment of the present invention will be explained with reference to the accompanying drawings.

Figure 1:
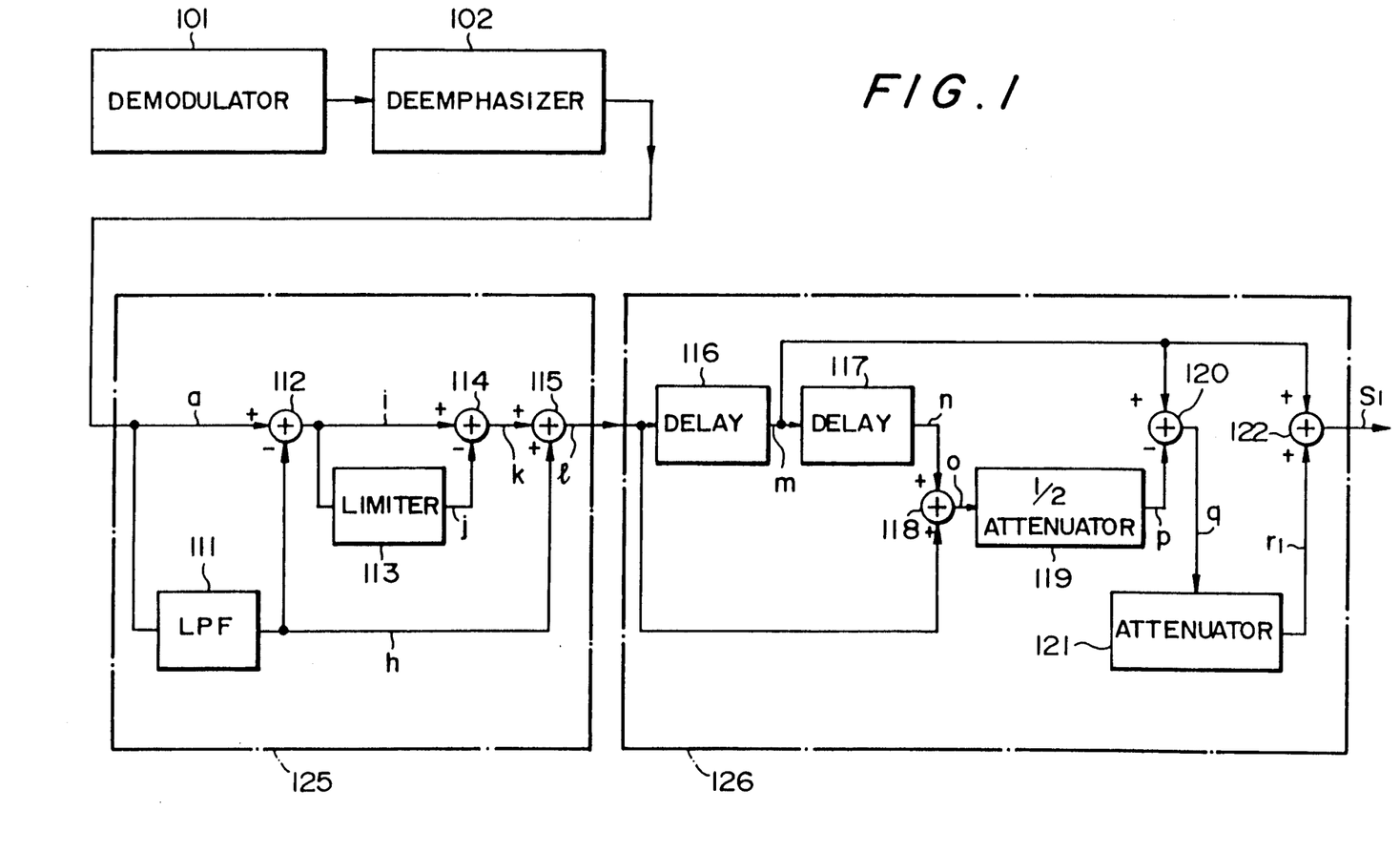
FIG. 1 is a block diagram of the structure of an embodiment of a video signal processing apparatus according to the present invention.

FIG. 1 is a block diagram of the structure of an embodiment of a video signal processing apparatus according to the present invention. In FIG. 1, the reference numeral 101 and 102 represent a demodulator and a deemphasis circuit similar to those in the prior art shown in FIG. 7.

In FIG. 1, an FM video signal is demodulated to a video signal of the baseband by the demodulator 101 and the high-frequency noise component of the video signal is reduced by the deemphasis circuit 102 in the same way as in the prior art.

The thus-obtained signal is supplied to a noise canceller circuit 125 to remove most of the noise before outline emphasis.

In the noise canceller circuit 125 in this embodiment, the deemphasized video signal is supplied to an LPF 111 to cut off the high-frequency band. Both the output of the LPF 111 and the deemphasized video signal are supplied to a first subtracter 112 for substraction.

The output of the first subtracter 112 is supplied to a second subtracter 114 both directly and through a limiter 113, and the second subtracter 114 executes the subtraction of the outputs of the first subtracter 112 and the limiter 113.

The output of the second subtracter 114 and the output of the LPF 111 are added by a first adder 115.

That is, the noise canceller circuit 125 is composed of the LPF 111, the first and second subtracters 112 and 114, the limiter 113 and the first adder 115.

The signal with most of the noise removed by the noise canceller circuit 125 is processed by an outline emphasizing circuit 126.

The outline emphasizing circuit 126 incorporates first and second delay circuits 116, 117 which are connected in series, and a second adder 118. The output of the second delay circuit 117 and the output of the noise canceller circuit 125 are first added by the second adder 118.

The output of the second adder 118 is supplied to a ½ attenuator 119 to attenuate the output level by ½.

The attenuated signal output from the ½ attenuator 119 and the delayed signal of the first delay circuit 116 are supplied to a third subtracter 120, and the output of the third subtracter 120 is supplied to an attenuator 121.

That is, the outline emphasizing circuit 126 is composed of the first and second delay circuits 116, 117, the second and third adders 118, 122, the attenuators 119 and 121 and the third subtracter 120.

The operation of the first embodiment having the above-described structure will now be explained with reference to FIGS. 1 and 2.

Figure 2:
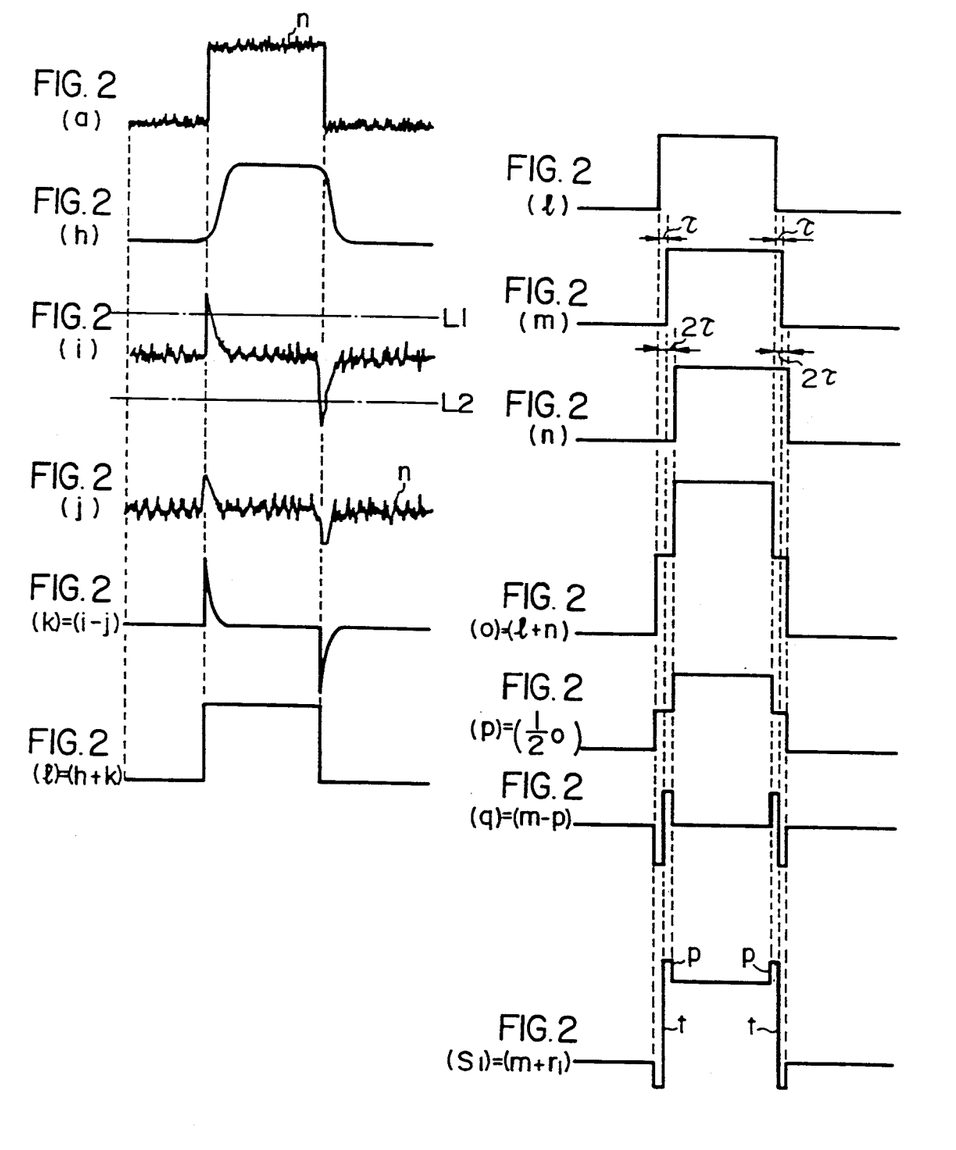
FIG. 2 is the actuating signal waveform diagram of the embodiment shown in FIG. 1.

The video signal indicated by (a) in FIG. 2, which has been demodulated by the demodulator 101, the high-frequency noise component, of which has been reduced by the deemphasis circuit 102 and which includes the remaining noise component n, is input to the noise canceller circuit 125. The video signal is first passed through the LPF 111, wherein the noise component of a flat picture portion such as sky and wall which has a large area and easily comes into view is removed, thereby producing a signal indicated by (h) in FIG. 2. The signal (h) output from the LPF 111 is subtracted from the original video signal (a) by the first subtracter 112, thereby obtaining a difference signal component indicated by (i) in FIG. 2.

The difference signal component (i) is then input to the limiter 113 to limit the amplitude at limiting levels L1 and L2, thereby producing a signal component indicated by (j) in FIG. 2.

The signal component (j) output from the limiter 113 is subtracted from the difference signal component (i) output from the first subtracter 112 by the second subtracter 114, whereby the spike-like difference signal component including almost no noise as indicated by (k) in FIG. 2 is obtained. When the spike-like difference signal component (k) is added to the signal (h) output from the LPF 111 by the first adder 115, a signal including almost no noise component as indicated by (l) in FIG. 2 is obtained.

In this way, in the noise canceller circuit 125, most of the noise component n is removed without deforming the waveform of the original video signal (a).

The video signal (l) with most, of the noise component n removed, is then input to the outline emphasizing circuit 126. The video signal (l) is first input to the first and second delay circuits 116, 117, thereby producing signals delayed by $\tau$ seconds, respectively, as indicated by (m) and (n) in FIG. 2. By adding the video signal (n) delayed by $2\tau$ sec and the video signal (l) by the second adder 118, a signal indicated by (o) in FIG. 2 is obtained and by passing the signal (o) through the ½ attenuator 119, a signal indicated by (p), which has half of the amplitude of the signal (o) is obtained.

When the signal (p) is subtracted from the signal (m) output from the first delay circuit 116 by the third subtracter 120, a signal indicated by (q) in FIG. 2 is obtained. The signal (q) has a waveform indicating the generation of narrow pulses at the respective rise and break of the video signal, and by passing the signal (q) through the attenuator 121, it is attenuated to an appropriate amplitude. The attenuated signal ($r_1$) shown in FIG. 1 is added to the signal (m) output from the first delay circuit 116 by the third adder 122, thereby producing a signal having a waveform indicated by ($s_1$) in FIG. 2. The video signal ($s_1$) is delayed by $\tau$ sec relative to the original video signal (a), but since it is provided with peaks having a narrow pulse width and a large amplitude at the transient portions t, the video signal has a very high sharpness.

The, thus-obtained video signal will be examined as to its frequency characteristics.

If it is assumed that the phase (Vl) of the video signal (l) output from the first adder 115 is Vl=sin $\omega$t, the phase Vo of the output signal (o) of the second adder 118 is $$\begin{aligned} Vo &= Vl + Vl\,(t = 2\tau) \\ &= \sin \omega t + \sin \omega(t - 2\tau) \\ &= 2\sin \frac{\omega t + \omega(t - 2\tau)}{2} \cos \frac{\omega t - \omega(t - 2\tau)}{2} \\ &= 2 \sin\omega\,(t - \tau) \cos \omega t \end{aligned}$$

Therefore, the phase Vp of the output signal (p) of the ½ attenuator 119, the phase Vq of the output signal (q) of the third subtracter 120 and the phase $Vs_1$ of the output signal ($s_1$) of the third adder 122 are respectively $$\begin{aligned} Vp &= 1/2\, Vo = \sin \omega(t - \tau) \cos \omega t \\ Vq &= Vm - Vp \\ &= \sin \omega\,(t - \tau) - \sin\omega(t - \tau) \cos \omega t \\ &= \sin \omega\,(t - \tau)\,(1 - \cos\omega t) \\ Vs_1 &= Vm + Vq\,K \\ &= \sin \omega(t - \tau) + K(1 - \cos \omega t) \sin \omega(t - \tau) \\ &= (1 + K - K \cos \omega t) \sin \omega(t - \tau) \end{aligned}$$

wherein K represents a level control value.

That is, the phase $Vs_1$ of the video signal ($s_1$) is output with $\tau$-sec delay relative to the phase Vl of the video signal (l), and the phase difference $\theta$ between both signals ($s_1$) and (l) is $$\theta = L \frac{Vs_1}{Vl} = \omega(t - 2\tau) - \omega t = -\omega t$$

That is, the phase difference $\theta$ is linear relative to the phase $\omega$, namely, the frequency.

The group delay characteristic of the first and second delay circuits 116 and 117 is obtained by differentiating the phases with respect to $\omega$, namely, $d\theta/d\omega=(-\tau)=-\tau$. In other words, the group delay characteristic is a function of the delay time $\tau$, solely, and does not change with the frequency. Thus, a smooth signal processing of the group delay characteristic is enabled in a wide range of frequency bands, thereby precluding the possibility of producing a strain on the video signal.

Another embodiment of the present invention will be explained in the following.

Figure 3:
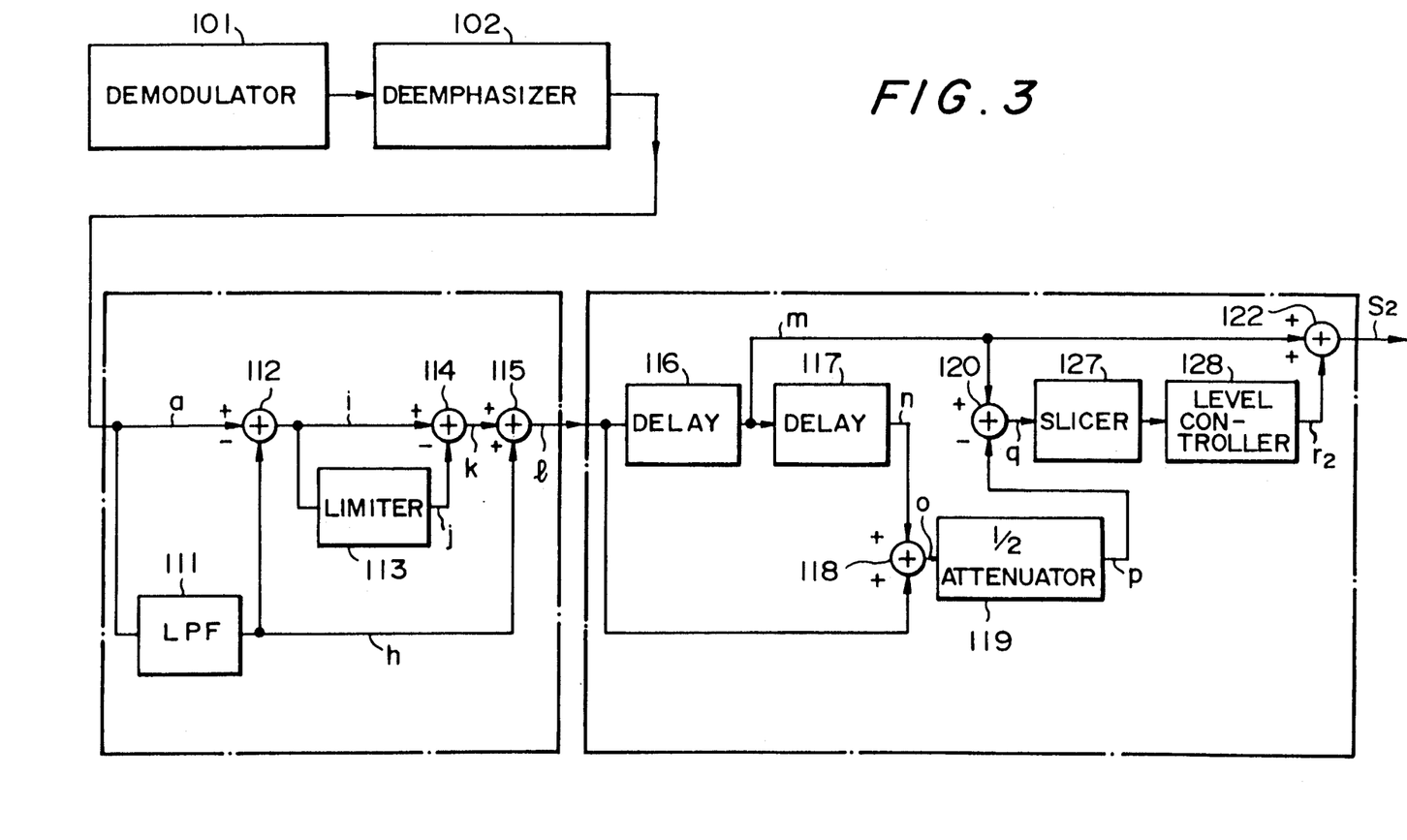
FIG. 3 is a block diagram of the structure of another embodiment of the present invention which is adapted to video signal outline correction.

FIG. 3 shows the structure of another embodiment of a video signal processing apparatus according to the present invention which is mainly adapted to video signal outline correction. The same reference numerals are provided for the elements which are the same as those of the first embodiment, and explanation thereof will be omitted.

The output of the third subtracter 120 in the outline emphasizing circuit 126 is supplied to a slicer 127 to be sliced at predetermined slicing levels S1 and S2.

The output of the slicer 127 is supplied to a level controller 128 to adjust the level of the sliced signal to an appropriate level.

The third adder 122 adds the output signal of the level controller 128 and the output of the first delay circuit 116. The first and second delay circuits 116, 117, the second and third adders 118 and 122, the ½ attenuator 119, the third subtracter 120, the slicer 127 and the level controller 128 constitute the outline emphasizing circuit 126.

The operation of this embodiment having the above-described structure will now be explained with reference to FIGS. 3 and 4.

Figure 4:
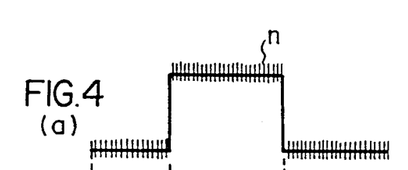
FIG. 4 is the actuating signal waveform diagram of the embodiment shown in FIG. 3.

The video signal indicated by (a) in FIG. 4, which has been demodulated by the demodulator 101, the high-frequency noise component of which has been reduced by the deemphasis circuit 102 and which includes the remaining noise component n, is input to the noise canceller circuit 125. The video signal is first passed through the LPF 111, wherein the noise component of a flat picture portion such as sky and wall which has a large area and easily comes into view is removed, thereby producing a signal indicated by (h) in FIG. 4. The signal (h) output from the LPF 111 is subtracted from the original video signal (a) by the first subtracter 112, thereby obtaining a difference signal component indicated by (i) in FIG. 4.

The difference signal component (i) is then input to the limiter 113 to limit the amplitude at the limiting levels L1 and L2, thereby producing the signal component indicated by (j) in FIG. 4.

The signal component (j) output from the limiter 1 3 is subtracted from the difference signal component (i) output from the first subtracter 112 by the second subtracter 114, whereby the spike-like difference signal component including almost no noise as indicated by (k) in FIG. 4 is obtained. When the spike-like difference signal component (k) is added to the signal (h) output from the LPF 111 by the first adder 115, a signal including almost no noise component as indicated by (l) in FIG. 4 is obtained.

In this way, in the noise canceller circuit 125, most of the noise component n is removed without deforming the waveform of the original video signal (a).

The video signal (l), with most of the noise component n removed, is then input to the outline emphasizing circuit 126. In the first embodiment shown in FIGS. 1 and 2, the outline is emphasized on the assumption that the noise is completely eliminated by the noise canceller circuit 125. The second embodiment, however, is characterized in that the noise inevitably remaining after the processing by the noise canceller circuit 125 is effectively suppressed simultaneously with the emphasis of the outline. The structure and operation of noise suppression will be explained in detail hereinunder.

In the waveforms shown in FIG. 4, the video signals including the residual noise after the removal of the noise are indicated by (l) to (s$_2$) on the right side of the drawing. The video signal (l) is first input to the first and second delay circuits 116, 117, thereby producing signals delayed by $\tau$ seconds, respectively, as indicated by (m) and (n) in FIG. 4. By adding the video signal (n) delayed by $2\tau$ sec and the video signal (l) by the second adder 118, a signal indicated by (o) in FIG. 4, which has stepped portions at the respective rise and break portions, is obtained. Since the polarity and the phase of the noise component are not constant but random, addition and subtraction of the noise component are not simple and both are represented by the root of the sum of the square of the respective amounts of noise Na.

The original signal portion is doubled but the amount of noise becomes $\sqrt{Na^2 + Na^2}$, namely, $\sqrt{2}$ times Na, as indicated by (0) in FIG. 4. By passing the signal (o) through the ½ attenuator 119, a signal indicated by (p) is obtained. In the signal (p), the original signal portion is the same but the amount of noise is $\sqrt{2}/2 = 0.7$ time in comparison with the signal (l). Thus, the noise component is reduced, thereby enhancing the signal-to-noise ratio.

When the signal (p) is subtracted from the signal (m) output from the first delay circuit 116 by the third subtracter 120, a signal indicated by (q) in FIG. 4 is obtained. The signal (q) has a waveform indicating the generation of narrow pulses at the respective rise and break of the video signal. This signal is used as an outline correction signal.

If random noise is overlapped with the outline correction signal at the narrow transient pulse width portions, then edge noise is overlapped with the outline correction signal at the outline portion, thereby greatly deteriorating the picture quality. In this embodiment, however, the signal (q) is input to the slicer 127 so as to be sliced at the predetermined slicing levels S1, S2, whereby the noise at the tip portions of the transient pulse portions is removed.

The sliced signal is then adjusted to a predetermined level by the level controller 128 to obtain a signal (r$_2$) shown in FIG. 3, which is then added to the signal (m) output from the first delay circuit 116 by the third adder 122, thereby producing a signal having a waveform indicated by (s$_2$) in FIG. 4.

Since the noise component becomes the root of the sum of the square of the respective amounts of noise in the third subtracter 120 and the third adder 122 as in the second adder 118, it is possible to enhance the signal-to-noise ratio by providing an attenuator for appropriately varying the ratio of the signal component and the noise component.

The thus-obtained video signal will be examined as to its frequency characteristics.

If it is assumed that the phase (Vl) of the video signal (l) output from the first adder 115 is $Vl = \sin \omega t$, the phase Vo of the output signal (o) of the second adder 118 is $$\begin{aligned}
Vo &= Vl + Vl\,(t = 2\tau) \\
&= \sin \omega t + \sin \omega(t - 2\tau) \\
&= 2\sin\frac{\omega t + \omega(t - 2\tau)}{2} \cos\frac{\omega t - \omega(t - 2\tau)}{2} \\
&= 2 \sin\omega\,(t - \tau) \cos \omega t
\end{aligned}$$

Therefore, the phase Vp of the output signal (p) of the ½ attenuator 119, the phase Vq of the output signal (q) of the third subtracter 120 and the phase Vs$_1$ of the output signal (s$_1$) of the third adder 122 are, respectively;

$$\begin{aligned}
Vp &= 1/2\, Vo = \sin \omega(t - \tau) \cos \omega t \\
Vq &= Vm - Vp \\
&= \sin \omega\,(t - \tau) - \sin\omega(t - \tau) \cos \omega t \\
&= \sin \omega\,(t - \tau)(1 - \cos\omega t) \\
Vs_1 &= Vm + Vq\, K \\
&= \sin \omega(t - \tau) + K(1 - \cos \omega t) \sin \omega(t - \tau) \\
&= (1 + K - K \cos \omega t) \sin \omega(t - \tau)
\end{aligned}$$

wherein K represents a level control value.

That is, the phase (Vs$_1$) of the video signal (s$_1$) is output with $\tau$ sec delay relative to the phase (Vl) of the video signal (l), and the phase difference $\theta$ between both signals (s$_1$) and (l) is $$\theta = L\frac{Vs_1}{Vl} = \omega(t - 2\tau) - \omega t = -\omega t$$

That is, the phase difference $\theta$ is linear relative to the phase $\omega$, namely, the frequency.

The group delay characteristic of the first and second delay circuits 116 and 117 is obtained by differentiating the phases with respect to $\omega$, namely, $d\theta/d\omega = (-\omega\tau) = -\tau$. In other words, the group delay characteristic is a function of the delay time $\tau$, solely, and does not change with the frequency. Thus, a smooth signal processing of the group delay characteristic is enabled in a wide range of frequency band, thereby precluding the possibility of producing a strain on the video signal.

Figure 5:
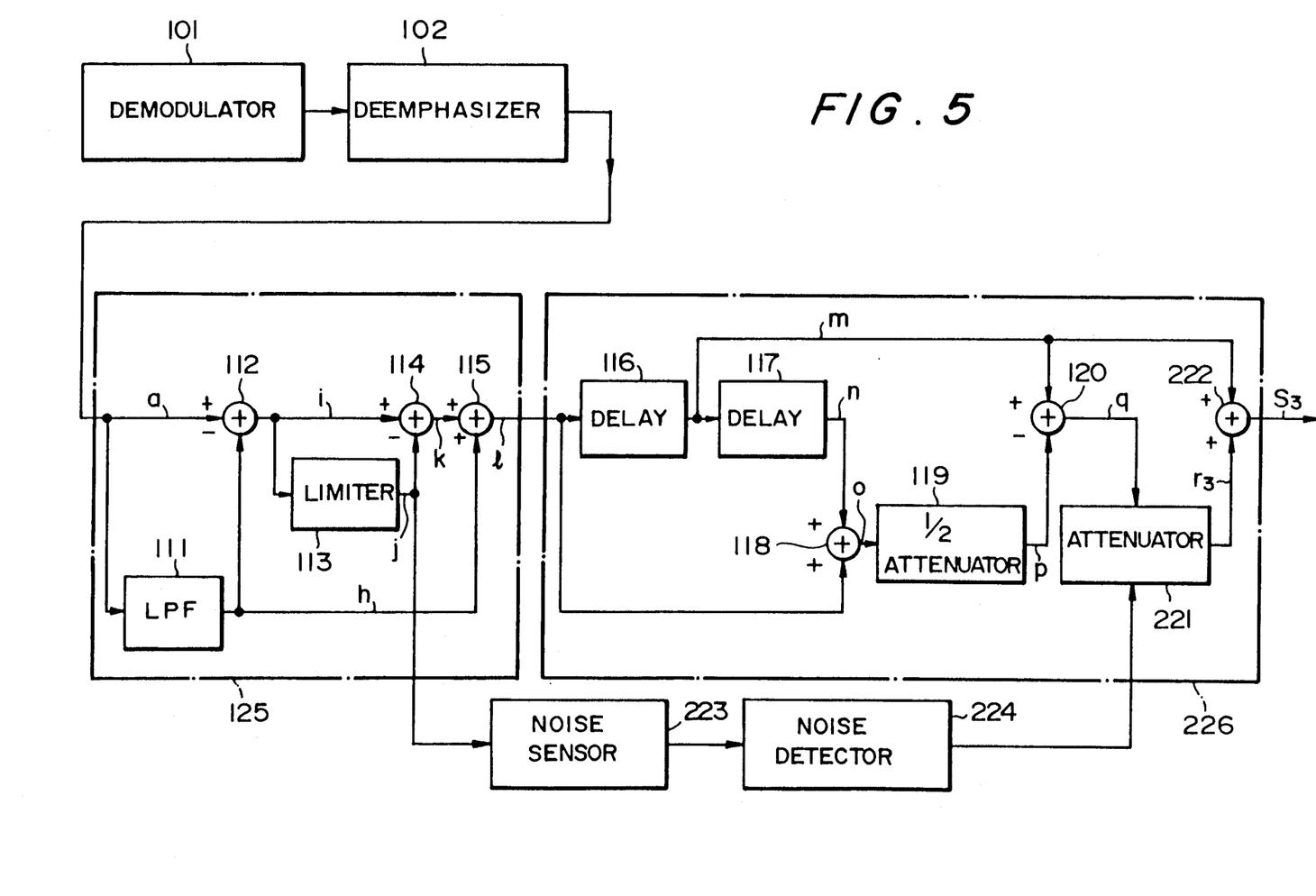
FIG. 5 is a block diagram of still another embodiment of the present invention which is also adapted to video signal outline correction.

FIG. 5 shows the structure of still another embodiment of a video signal processing apparatus according to the present invention which is mainly adapted to video signal outline emphasis. The same reference numerals are provided for the elements which are the same as those of the first and second embodiments, and explanation thereof will be omitted.

In FIG. 5, a noise sensor 223 for detecting the noise component is composed of a band pass filter. The reference numeral 224 represents a noise detector for detecting the amplitude of the noise component and 221 represents an attenuator constituting an outline correction level control circuit. The attenuator 221 automatically varies the ratio of the signals (m) and (q) input to a third adder 222. More specifically, by adding the detection output voltage from the noise detector 224 to the attenuator 221 as a gain control voltage, the magnitude of the output signal (q) of the third subtracter 120 is controlled, thereby varying the level of the outline correction signal.

The operation of the embodiment shown in FIG. 5 will now been explained with reference to FIG. 6.

Figure 6:
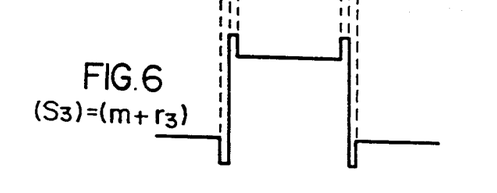
FIG. 6 is the actuating signal waveform diagram of the embodiment shown in FIG. 5.
Figures 6, 6J, 6K, 6O, 6P, 6Q:
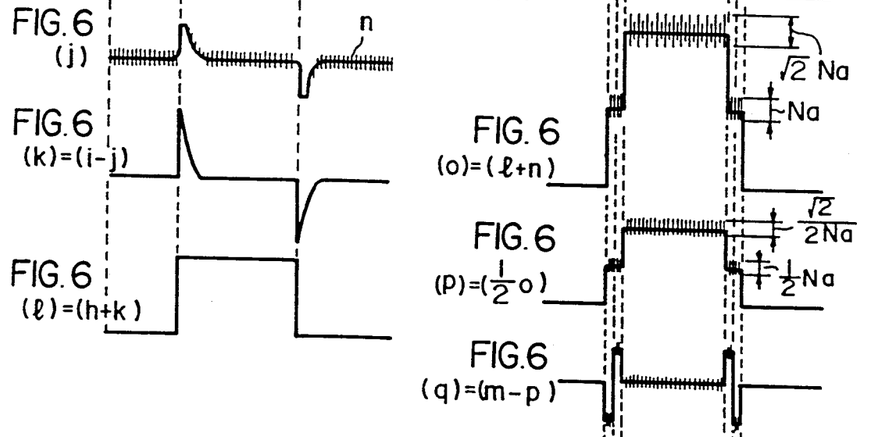
Figures 6, 6A, 6H, 6I, 6M, 6N:
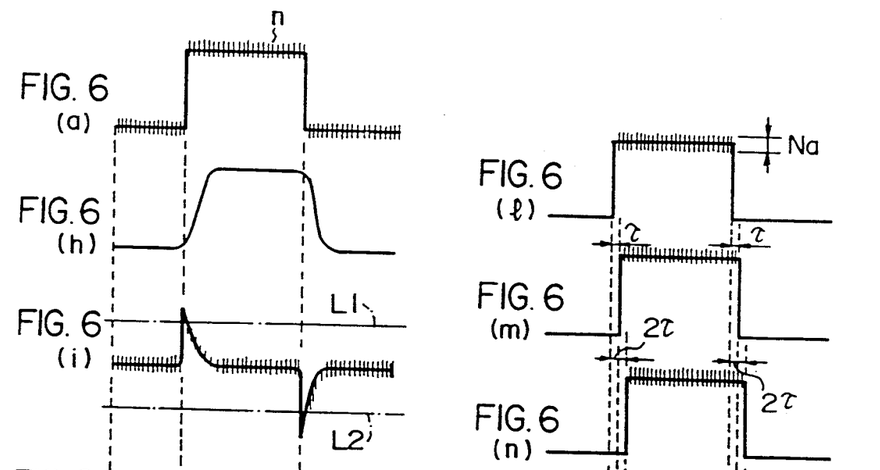

Since the operations for producing the video signal indicated by (a) in FIG. 6, which has been demodulated by the demodulator 101, the high-frequency noise component of which has been reduced by the deemphasis circuit 102 and which includes the noise component n to produce a signal with narrow transient pulses at the respective rise and break of the video signal as indicated by (q) in FIG. 6 are the same as the operations for producing the signals (a) to (q) in FIG. 4, the same waveform signals (a) to (q) are shown in FIG. 6 and explanation thereof will be omitted except for different operations.

The output signal (j) of the limiter 113 is input to the noise sensor 223 to detect the noise which is most visibly obtrusive, and the amplitude of the detected noise component is detected by the noise detector 224. The detection output voltage is then supplied to the attenuator 221 as a gain control voltage so that the amplitude of the output signal (q) of the third subtracter 120 is attenuated to a signal indicated by ($r_3$) in FIG. 5 with the varying attenuating ratio in accordance with the output of the noise detector 224, thereby obtaining the video signal having the waveform indicated by ($s_3$) in FIG. 6.

In this way, according to the embodiment shown in FIG. 5, for example, at the time of playback, using a magnetic tape of improper quality or recorded under bad recording conditions, the video signal ($s_3$) producing a distinct picture as a whole is obtained by greatly attenuating the output signal (q) which is used as the outline correction signal in accordance with the detection output voltage of the noise detector 224 by the attenuator 221 so as to suppress the addition of the signal (q) to the signal (m). On the other hand, at the time of playback, using a tape of a good quality or recorded in a good recording state, the video signal ($s_3$) producing a picture with good signal-to-noise ratio and high sharpness is obtained by adding the output signal (q) to the signal (m) to the maximum.

Each of the subtracters 112, 114 and 120 can be composed of the combination of an adder and an inverter connected to one input terminal of the adder in each of the above-described embodiments.

For each of the delay circuits 116 and 117, a delay line element having delay time of 100 nsec to 200 nsec is generally used. Alternatively, the delay circuits may be implemented by using active filters. The delay circuit composed of an active filter is optimum for the realization of an integrated circuit for the apparatus.

Although these embodiments are used as a video signal processing apparatus of a VTR, the same advantages are produced when it is adopted for video signal processing of a disk player or a television receiving set.

In the embodiment ,shown in FIG. 5, the noise sensor 223 is provided after its limiter 113, but the position is not restricted thereto and it may be provided, for example, after the deemphasis circuit 102. 2.3 MHz is the optimum frequency band of the band pass filter for the noise sensor 223, in the case of a VTR, but another band may be selected.

As described above, according to the present invention, it is possible to eliminate the noise component remaining in the demodulated video signal and, hence, to improve the signal-to-noise ratio by the noise canceller circuit composed of the LPF, the limiter, the subtracters and the adders for subtracting and adding the input and output signals of the LPF and the limiter, and also to greatly enhance the sharpness by adding narrow and deep peaks at transient portions of a video signal by the outline emphasizing circuit, which includes the delay circuits connected in series and which is provided after to the noise canceller circuit. Furthermore, since no overshoot or ringing phenomenon is generated, unlike in the prior art, it is possible to greatly improve the picture quality as a whole.

According to the preferred embodiment of the present invention, an outline correction signal is produced by the two delay circuits, the adder and the subtracter, and after the tip portions of the outline correction signal including the noise component are sliced, the outline correction signal is added to the original input video signal, whereby the outline correction signal, including no noise component at the edge portions and having narrow and deep peaks at transient portions, is produced. Thus, it is possible to obtain a picture with the improved signal-to-noise ratio and high sharpness. In addition, it is possible to obtain a good picture with a very low degree of noise as a whole without producing saturation, overshoot, preshoot or a ringing phenomenon.

Furthermore, since it is possible to appropriately control the sharpness and the fineness of the input video signal by varying the amplitude of the transient portions of the outline correction signal in accordance with the amount of noise component in place of slicing the tip portions, outline correction is enabled without producing saturation even if the input video signal has a large amplitude. Thus, improvement of the picture quality is achieved.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A video signal processing apparatus for removing the noise overlapped with an input signal which is picked up by a playback head of a VTR and executing noise reduction processing of said input signal so as to enhance the sharpness of the reproduced picture, said video signal processing apparatus comprising:
a demodulator for demodulating an FM video signal;
a deemphasis circuit for suppressing a high-frequency component of the output signal of said demodulator;
a noise canceller circuit for removing the noise component from the output signal of said deemphasis circuit including,
a low pass filter for removing said high-frequency component from said output signal of said deemphasis circuit,
a first subtractor for subtracting the output signal of said low pass filter from said output signal of said deemphasis circuit,
a limiter for limiting the amplitude of the output signal of said first subtractor at a predetermined level, a second subtractor for subtracting the output signal of said limiter from said output signal of said first subtractor, and a first adder for adding the output signal of said second subtractor and said output signal of said low pass filter to produce a noise canceller circuit output signal; and an outline emphasizing circuit for processing the output signal of said noise canceller circuit so as to form peaks having a narrow pulse width and a large amplitude at transient portions of the pulse wave of said output signal with bipolarity including, first and second delay circuit connected to each other in series so as to delay the output signal of said first adder by respective predetermined amounts, a second adder for adding the output signal of said second delay circuit and said output signal of said first adder, a ½ attenuator for reducing the amplitude of the output signal of said second adder by ½, a third subtractor for subtracting the output signal of said ½ attenuator from the output signal of said first delay circuit, and a third adder for adding said output signal of said first delay signal circuit and the output signal of said third subtractor.

2. The video signal processing apparatus of claim 1, wherein an attenuator for attenuating the amplitude of said output signal of said third subtractor at a second predetermined level is provided between said third subtractor and said third adder.

3. The video signal processing apparatus of claim 1, wherein each of said first, second and third subtractors includes a polarity inverting circuit such as an inverter.

4. The video signal processing apparatus of claim 1, wherein each of said first and second delay circuits is composed of a delay line element having delay time of 100 to 2009 nsec.

5. The video signal processing apparatus of claim 1, wherein each of said first and second delay circuits is composed of an active filter.

6. The video signal processing apparatus of claim 1, wherein said outline emphasizing circuit comprises:

first and second delay circuits connected to each other in series so as to delay the output signal of said first adder by respective predetermined amounts, a second adder for adding the output signal of said second delay circuit and said output signal of said first adder, a ½ attenuator for reducing the amplitude of the output signal of said second adder by ½, a third subtractor for subtracting the output signal of said ½ attenuator from the output signal of said first delay circuit, a slicer for slicing the output signal of said third subtractor at a second predetermined level so as to remove the noise at the tip portions of the output pulse of said output signal, a level controller for adjusting the level of the output signal of said slicer to a third predetermined level, and a third adder for adding said output signal of said level controller and said output signal of said first delay circuit.

7. A video signal processing apparatus according to claim 2, further comprising:

a noise sensor for extracting noise exceeding a third predetermined level from said output signal of said limiter; and a noise detector for detecting the amplitude of the noise component detected by said noise sensor and applying the detected output voltage to said attenuator as a gain control voltage;

said attenuator automatically varying the ratio of said output signal of said first delay circuit and said output signal of said third subtracter in response to the output signal of said noise detector.

* * * * *